United States Patent [19]
Doyle

[11] 3,746,028
[45] July 17, 1973

[54] CONTROL SYSTEM HAVING VIBRATION-RESPONSIVE MEANS AND A VIBRATION-RESPONSIVE UNIT FOR SUCH SYSTEM OR THE LIKE

[75] Inventor: Donald A. Doyle, Santa Ana, Calif.

[73] Assignee: Robertshaw Controls Company, Richmond, Va.

[22] Filed: June 10, 1971

[21] Appl. No.: 151,653

[52] U.S. Cl. ................................................. 137/38
[51] Int. Cl. ........................................... F16k 17/36
[58] Field of Search .................. 137/38, 46, 39, 45; 116/114 D; 340/261; 200/61.45 R

[56] References Cited
UNITED STATES PATENTS

| | | | |
|---|---|---|---|
| 2,942,247 | 6/1960 | Lienau et al. | 340/261 X |
| 3,340,521 | 9/1967 | Patterson, Jr. et al. | 340/261 X |
| 3,512,555 | 5/1970 | Severson | 137/45 |
| 2,966,617 | 12/1960 | Hardway, Jr. | 200/61.45 R X |

Primary Examiner—Robert G. Nilson
Attorney—Auzville Jackson, Jr., Robert L. Marben and Candor, Candor & Tassone

[57] ABSTRACT

A self-contained unit for use in a control system having a device normally disposed in one operative condition thereof, the unit having a vibration responsive means adapted to be operatively interconnected to the device to be unset and thereby cause the device to be in another operative condition thereof when the vibration responsive means senses a vibration in excess of a certain value. The unit has resetting means operatively interconnected to the vibration responsive means to be adapted to automatically reset the same after the vibration responsive means has sensed one shock in excess of the certain value to prevent that one shock from effectively causing the device to be in the other condition thereof while being ineffective thereafter to reset the vibration responsive means if another excessive shock is sensed by the vibration responsive means within a certain time period after the occurrence of first excessive shock.

18 Claims, 2 Drawing Figures

INVENTOR
DONALD A. DOYLE

CONTROL SYSTEM HAVING VIBRATION-RESPONSIVE MEANS AND A VIBRATION-RESPONSIVE UNIT FOR SUCH SYSTEM OR THE LIKE

This invention relates to an improved control system having vibration responsive means and to an improved vibration responsive unit having means for automatically resetting the same after the occurrence of a shock or the like in excess of a certain value.

It is well known that vibration responsive means have been provided to detect excessive vibrations such as on reciprocating or rotating motors, pumps, turbines, and the like so as to provide a pneumatic signal if and when such excessive vibrations occur with that signal either sounding an alarm or shutting down the equipment depending upon the needs and connections made by the user. The vibration responsive unit can be manually reset for further use thereof.

One of the disadvantages of such a device is that the alarm or shut-down signal produced by the vibration responsive unit is given almost immediately upon the first occurrence of one excess vibration and, therefore, a transient vibration excess, such as may be caused by a sonic boom or by the accidental striking of the unit with a heavy tool or the like, would cause the alarm or shut-down signal to be initiated and thereby provide a false or unnecessary detection.

In order to overcome such disadvantage, some manufacturers have provided externally connected vibration monitor units that may be connected to the vibration responsive unit to prevent alarm or shut-down due to transient vibration excesses by incorporating therein various delays which are usually adjustable and may reset and resample vibration levels several times and give an alarm or shut-down signal only if some repeated excess vibration level has persisted for some predetermined time.

However, such units are packaged in separate containers and are mounted remotely from the vibration responsive unit whereby not only are expensive mounting arrangements required, but also the units themselves are relatively expensive.

One feature of this invention is to provide a relatively simple and inexpensive unit to detect a single transient excess vibration or shock and prevent alarm or shut-down of the system unless such excess vibration or shock should substantially immediately recur a second time.

Another feature of this invention is to provide such transient detection means by use of a small and inexpensive part that can be readily housing in a conventional vibration responsive housing itself thereby eliminating any external monitoring devices.

Another feature of this invention is to maintain the identical external connecting lines and devices in the prior known systems by utilizing the vibration responsive unit of this invention so that true retrofit is possible without additional plumbing, devices, or expenses to the user.

In particular, one embodiment of this invention provides a self-contained vibration responsive and automatic resetting unit for use in a control system having a device normally disposed in one operative condition thereof and which when disposed in another operative condition thereof will produce an alarm or shut-down signal. The unit has a vibration responsive means adapted to be operatively interconnected to the device to be unset and thereby cause the device to be in the other operative condition thereof for producing the alarm or shutdown signal when the vibration responsive means senses a vibration in excess of a certain value. The unit has resetting means operatively interconnected to the vibration responsive means to be adapted to automatically reset the vibration responsive means after the vibration responsive means has sensed one shock in excess of the certain value to prevent that one shock from effectively causing the device to be in the other condition thereof while being ineffective thereafter to reset the vibration responsive means within a certain time period after the occurrence of the one or first excessive shock.

Accordingly, it is an object of this invention to provide an improved vibration responsive means having one or more of the novel features set forth above or hereinafter shown or described.

Another object of this invention is to provide an improved control system utilizing such a vibration responsive means or the like.

Other objects, uses, and advantages of this invention are apparent from a reading of this description which proceeds with reference to the accompanying drawings forming a part thereof and wherein.

Figure 1:
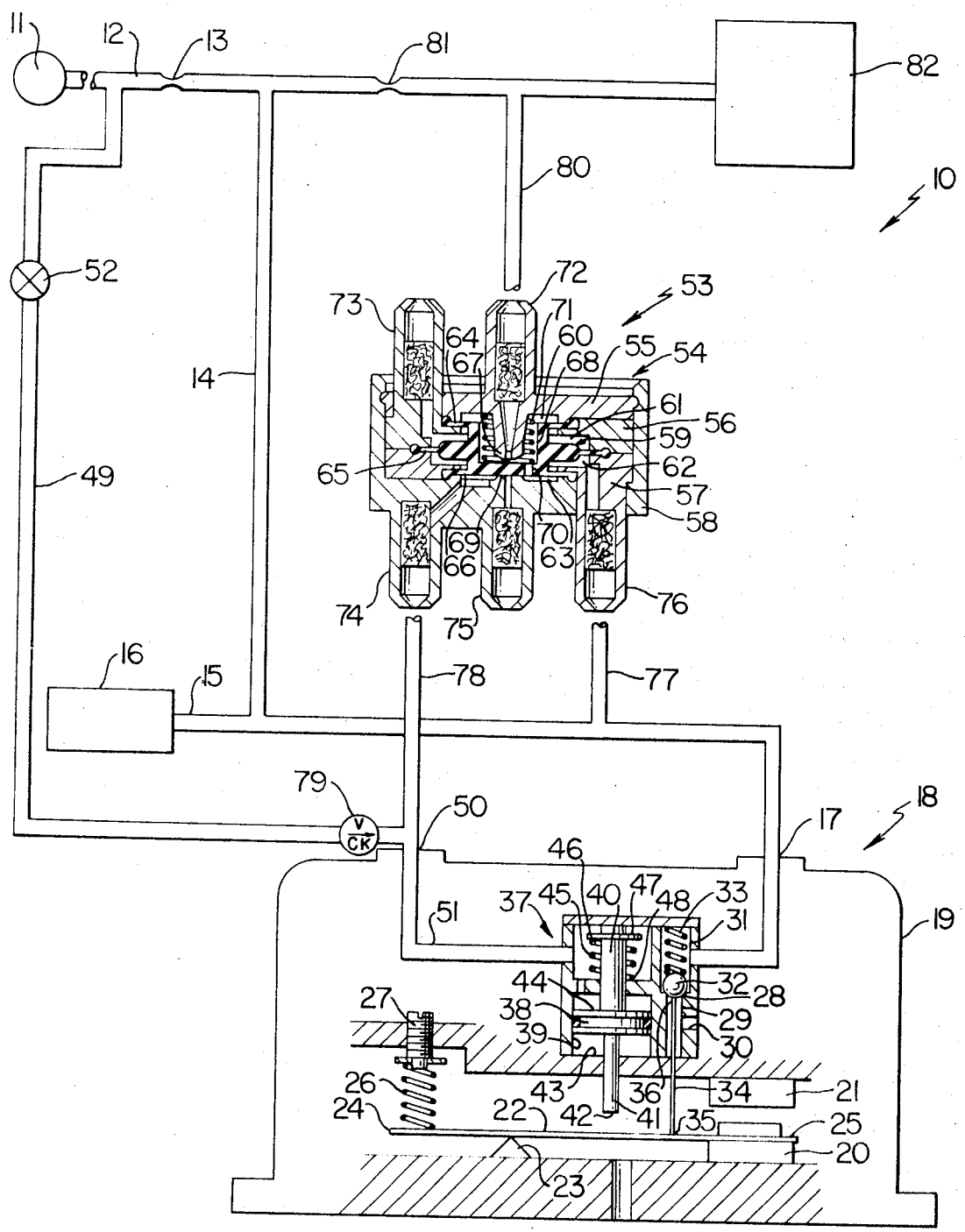
FIG. 1 is a schematic view, with certain parts thereof being shown in cross-section, illustrating the control system of this invention utilizing one embodiment of the vibration-responsive means of this invention.

While the various features of this invention are hereinafter described and illustrated as being particularly adapted to control a pneumatically operated relay device for producing a penumatic signal for an alarm or for operation shutdown purposes, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate one of the wide variety of uses of this invention.

Referring now to FIG. 1, one embodiment of the improved control system of this invention is generally indicated by the reference numeral 10 and comprises a pneumatic source 11 for supplying a pressurized fluid through a supply conduit means 12 and first restrictor 13 to a branch conduit means 14 that leads to a conduit means 15 interconnected to a pneumatically operated device 16, such as a pneumatically operated relay or the like, that is adapted to produce an output signal for sounding an alarm or for shutting down an operating device, such as the aforementioned reciprocating or rotating motor, pump, turbine or the like, when the pneumatic signal to the device 16 through the conduit means 15 falls below a certain value as will be apparent hereinafter.

The conduit 15 that leads to the pneumatically operated device 16 also leads to an inlet port 17 of a vibration-responsive means or unit 18 comprising a housing means 19 and carrying a reset magnet 20 and a trip magnet 21 spaced from the reset magnet 20. A vibration responsive blade 22 is pivotally mounted in the housing 19, such as being pivoted on a fulcrum or pivot point 23 intermediate the ends 24 and 25 thereof, with the end 25 being disposed between the magnets 20 and 21 but normally being biased toward the trip magnet 21 by a compression spring 26 disposed between the other end 24 of the blade or lever 22 and an adjustable member 27 threadedly carried by the housing means 19. The reset magnet 20 is normally adapted to maintain the end 25 of the lever 22 in contact therewith as illustrated in FIG. 1 when the end 25 of the lever 22 has been moved against the reset magnet 20 in the manner hereinafter described whereby the end 25 of the lever 22 will remain against the reset magnet 20 until the lever 22 senses a vibration or shock in excess of the value as set by the adjustment member 27 whereby the end 25 of the lever 22 will move away from the reset magnet 20 under the force of the spring 26 and will engage against the trip magnet 21 to remain in contact therewith until the lever 22 is again reset back to the position illustrated in FIG. 1 in a manner hereinafter described.

The vibration-responsive unit 18 includes a valve seat 28 leading to a passage means 29 that has an outlet 30 for interconnecting the valve seat 28 to the atmosphere in an unrestricted manner when the valve seat 28 is open. The inlet port 17 of the housing 19 that is interconnected to the conduit 15 leads to an internal chamber 31 in the housing means 19 that is also adapted to be interconnected to the valve seat 28 on the other side thereof in relation to the passage means 29. A ball valve member 32 is disposed in the chamber 31 and is normally urged in a direction to close the valve seat 28 by a compression spring 33 disposed in the chamber 31 so that when the ball valve member 32 is closing the valve seat 28, the conduit 15 is prevented from being interconnected to the atmosphere through the outlet port 30 of the unit 18. However, when the ball valve member 32 is moved away from the valve seat 28 in a manner hereinafter described, the conduit 15 is vented to the atmosphere through the outlet port 30 and since the pneumatic source 11 is directing pressurized fluid through the restrictor 13 before the same can reach the conduit 15, the opened valve seat 28 suitably vents the conduits 14 and 15 at a faster rate than the source 11 can resupply the conduits 14 and 15 through the restrictor 13 so that the vent 30 maintains the conduits 14 and 15 in a vented condition whereby the pressure value therein has fallen below the value required to maintain the pneumatically operated device 16 in its non-alarm or shutdown signal condition thereof. Thus, the device 16 is caused to now be in another operating condition thereof for producing its alarm or shutdown signal.

The vibration-responsive lever 22 is adapted to move the ball valve member 32 off of the valve seat 28 and maintain the same away from the valve seat 28 when the end 25 of the lever 22 is disposed against the trip magnet 21 because of a rod or member 34 having one end 35 engaging against the lever 22 and another end 36 thereof projecting into the passage 29 and against the ball valve member 32. The axially movable rod 34 is of such a length that when the end 25 of the lever 22 is against the reset magnet 20 the ball valve member 32 is adapted to be maintained against the valve seat 28 by the force of the compression spring 33. However, when the end 25 of the lever 22 is caused to move upwardly against the trip magnet 21 upon the sensing of an excessive shock thereby, the lever 22 pushes the rod 34 upwardly and maintains the same in an upward position whereby the ball valve member 32 is moved off of and maintained out of contact with the valve seat 28 in opposition to the force of the compression spring 33 until the lever 22 is again reset to the position illustrated in FIG. 1.

The vibration-responsive unit 18 includes a pneumatically operated resetting means 37 that comprises a piston 38 disposed in a cylinder 39 formed in the housing means 19 and having opposed piston rods 40 and 41 projecting therefrom with the piston rod 41 extending out of the cylinder 39 and having an end 42 for engaging against the vibration-responsive lever 22 and moving the same against the reset magnet 20 when the piston 38 is moved downwardly in FIG. 1 against the end 43 of the cylinder 39 by a pneumatic signal being directed against the upper side 44 of the piston 38.

In order to maintain the piston 38 in the normal up position illustrated in FIG. 1 whereby the end 42 of the piston rod 41 will not interfere with the vibration-responsive lever 22 in moving upwardly against the trip magnet 21 when sensing an excessive shock or vibration, a compression spring 45 has one end 46 disposed against a retainer 47 carried on the piston rod 40 and the other end 48 thereof engaging against the housing means 19 whereby the compression spring 45 normally maintains the piston 38 in the up position illustrated in FIG. 1. However, when pneumatic pressure fluid is directed to the cylinder 39 on the side 44 of the piston 38, such force of fluid overcomes the force of the compression spring 45 and moves the piston 38 downwardly against the end 43 of the cylinder 39 to cause the end 42 of the piston rod 41 to move the lever 22 from against the trip magnet 21 against the reset magnet 20 for a resetting of the vibration-responsive means 18.

Such pneumatic resetting means 37 can have such pressure fluid directed to the cylinder 39 for the aforementioned resetting operation by a conduit means 49 that leads from the pneumatic source 11 to a reset port 50 in the housing means 19 that is interconnected to the cylinder 39 by an internal passage means 51. The conduit 49 can have a remotely located valve means 52 therein which, when turned to an open condition by the operator or the like, directs pneumatic fluid from the source 11 through the conduit 49 to the reset port 50 and, thus, to the cylinder 39 to cause the piston 38 to move downwardly and reset the lever 22 in the manner previously described. When the valve 52 is, thereafter, closed, the pressure fluid in its cylinder 39 is bled to atmosphere in a manner hereinafter described so that the compression spring 45 will return the piston 38 to its up and non-resetting position as illustrated in FIG. 1.

As previously stated, one of the features of this invention is to provide means for automatically causing resetting of the vibration-responsive layer 22 immediately after the initial sensing of one excessive shock or vibration so that a transient excessive shock or vibration will not cause the pneumatically operated device 16 to produce its alarm-producing or shut-down causing pneumatic signal unless another excessive vibration or shock occurs within a certain time period that is substantially immediately after that first excessive vibration or shock.

Such automatic resetting means of this invention comprises a pneumatically operated logic unit 53 which unit 53 is interconnected in the system 10 to produce a "NOT" logic function that will be more fully described hereinafter.

The use of the pneumatically operated logic unit 53 and the details of the structure thereof are fully set forth in the United States patent to Scott, U.S. Pat. No. 3,550,847, whereby such disclosure is incorporated herein by reference if it is desired to obtain further details of the unit 53 other than those which will now be briefly set forth to fully understand the features of this invention.

As illustrated in FIG. 1, the pneumatically operated logic unit 53 comprises a housing means 54 formed from four housing parts 55, 56, 57 and 58 snap-fitted together into the configuration illustrated to hold a diaphragm means 59 therebetween which cooperates with the housing parts 55-58 to define a plurality of separated chambers 60, 61, 62 and 63 disposed in axially stacked relation in the housing means 54. The diaphragm means 59 has one outboard diaphragm portion 64 defining the chamber 60 with the housing member 55 and cooperating with a larger, intermediate diaphragm portion 65 to define the chamber 61 therebetween. Another smaller outboard diaphragm portion 66 of the diaphragm means 59 cooperates with the intermediate diaphragm portion 65 to define the chamber 62 therebetween and cooperates with the housing part 58 to define the chamber 63.

The outboard housing part 55 has a valve seat 67 projecting into the chamber 60 and into a closed ended bore 68 formed in the center post portion of the diaphragm means 59 so that the outboard portion 66 of the diaphragm means 59 is adapted to open and close the valve seat 67 in a manner hereinafter described. The other outboard housing part 58 also has a valve seat 69 projecting into the chamber 63 to be opened and closed by the outboard diaphragm portion 66 of the diaphragm means 59, the valve seat 69 being coaxially aligned with the valve seat 67. The diaphragm portion 66 has one or more openings 70 passing therethrough in offset relation to the aligned valve seats 67 and 69 to always fluidly interconnect the outboard chambers 60 and 63 together regardless of the position of its diaphragm member 59 relative to the housing means 54.

A compression spring 71 is disposed in the chamber 60 of the unit 53 and acts on the diaphragm means 59 to tend to normally maintain the diaphragm means 59 in the position illustrated in FIG. 1 wherein the outboard diaphragm portion 66 is disposed against the valve seat 69 to close the same and is away from the valve seat 67 so that the valve seat 67 is fully opened to the chamber 60. However, should pressure fluid be directed into the chamber 62 of the unit 53, the resulting pressure differential acting across the intermediate diaphragm portion 65 will cause the diaphragm means 59 to move upwardly in opposition to the force of the compression spring 71 and thereby cause the outboard diaphragm portion 66 to move away from the valve seat 69 to open the same while moving against the valve seat 67 to close the same for a purpose hereinafter described.

The unit 53 has a plurality of nipple means 72, 73, 74, 75 and 76 for leading to the various chambers thereof.

In particular, the nipple 73 has the passage means thereof leading to the chamber 61. The nipple 72 has its passage means leading to the valve seat 67 and, thus, to the chamber 60 when the valve seat 67 is opened. The nipple 74 has its passage means leading to the chamber 63 in an offset manner relative to the valve seat 69 so as to be always interconnected to the chamber 63 regardless of the open or closed condition of the valve seat 69. The nipple 75 has its passage means leading to the valve seat 69 whereby the nipple 75 will be interconnected to the chamber 63 when the diaphragm means 59 is moved away from the valve seat 69. The nipple means 76 has its passage means leading to the chamber 62.

The logic unit 53 is adapted to be interconnected into the pneumatic system 10 to produce a "NOT" logic function by having the nipple means 76 thereof fluidly interconnected to a branch conduit 77 that is also interconnected to the conduit 15 that leads to the pneumatically operated device 16. Thus, as long as pressure fluid is in the conduit 15 to maintain the pneumatically operated device 16 in its non-signal producing condition as previously described, such fluid pressure in the conduit means 15 is also directed to the chamber 62 of the logic unit 53 so that the resulting pressure differential acting across the intermediate diaphragm portion 65 thereof causes the diaphragm means 59 to move upwardly and be maintained in its upward condition against the force of the compression spring 71 so that the valve seat 69 is maintained in an open condition and the valve seat 67 is maintained in a closed condition.

The nipple means 74 of the unit 53 is interconnected by a conduit 78 to the reset portion 50 of the vibration-responsive means 18 while the nipple means 75 is interconnected to the atmosphere. Thus, as long as pressure fluid of a certain value is in the conduit 15 and the diaphragm means 59 is, thus, in its up condition by the presence of the pressure force in the chamber 62, the chamber 63 of the unit 53 is interconnected to the atmosphere through the opened valve seat 69 so that the conduit 78 is likewise interconnected to the atmosphere. With the conduit 78 interconnected to the atmosphere, it can be seen that the cylinder 39 of the pneumatically operated reset means 37 of the unit 18 is also interconnected to the atmosphere through the conduit 78 so that the piston 38 remains in its up and non-resetting position as illustrated in FIG. 1.

When the remote and manually operated reset valve means 52 is utilized in the system 10 it can be seen that the conduit means 49 leading from the valve means 52 and the conduit means 78 leading from the unit 53 both join together at the reset portion 50 of the unit 18. However, the conduit 49 leading from the remotely operated valve means 52 has a one-way check valve 79 therein to isolate the conduit 49 from the conduit 78 immediately adjacent the reset port 50 for a purpose hereinafter described so that when the conduit 78 has pressurizied fluid created therein by the unit 53, such pressurized fluid closes the check valve 79 and therefore cannot enter the conduit 49 for a purpose hereinafter described.

The nipple 73 of the unit 53 is interconnected to the atmosphere so that the chamber 61 of the unit 53 is always interconnected to the atmosphere. The remaining nipple 72 of the unit 53 is interconnected by a branch conduit 80 to the conduit 12 that leads from the pneumatic source 11. However, the supply conduit 12 has another restrictor means 81 therein intermediate the branch conduit 14 and the branch conduit 80 that leads to the unit 53 for a purpose hereinafter described, whereby the branch conduit 80 is interconnected to the source 11 downstream from the series arranged restrictors 13 and 81. Such downstream side of the conduit means 12 also leads to an accumulator tank 82 for the storage of pressure fluid therein for a purpose hereinafter described.

While it is to be understood that various pressures and restrictor sizes can be utilized for the control system 10 to function in the manner hereinafter described, one workable arrangement is to have the pneumatic source 11 supply pressure fluid at a value of approximately 20 psi, the first restrictor 13 be approximately 0.028 of an inch in diameter, the second restrictor 81 to be approximately 0.007 of an inch in diameter, the accumulator tank 82 have a volume of approximately 1.4 cubic inches, the compression spring 71 of the unit 53 be of a force to move the diaphragm means 59 downwardly to close the valve seat 69 and open the valve seat 67 when the pressure in the chamber 62 and, thus, in the conduit means 14, 15 and 77 has been reduced to approximately 9 to 11 psi, and the pneumatically operated device 16 be changed over to produce its alarm or shut-down signal when the pressure in the conduits 14, 15 and 77 has been reduced to approximately 3 psi which occurs when the valve seat 28 is maintained in an open condition for a certain length of time by the vibration responsive lever 22 having its end 25 disposed against the trip magnet 21.

The operation of the control system 10 will now be described.

With the vibration responsive lever 22 having its end 25 against the reset magnet 20 so that the valve member 32 is maintaining the valve seat 28 in its closed condition, the pressure source 11 will maintain the pneumatically operated device 16 in its non-signal producing condition and the diaphragm means 59 of the "NOT" logic unit 53 will be in its up condition as the chamber 62 thereof is pressurized whereby the diaphragm portion 66 maintains the valve seat 67 in its closed condition and the valve seat 69 in its open condition so that the atmosphere is directed to the cylinder 39 of the reset means 37. Thus, the reset piston 38 is in the up condition illustrated in FIG. 1.

The pressure source 11 is also interconnected through the restrictors 13 and 81 to the accumulator tank 82 so that eventually sufficient pressure fluid bleeds through the restrictor 81 to pressurize the accumulator tank 82 which is prevented from being interconnected to the chamber 63 and, thus, to the atmosphere through the logic unit 53 because the intermediate diaphragm portion 66 is being maintained against the valve seat 67 in opposition to the force of the compression spring 71.

With the control system 10 now disposed in the position previously described, one excessive shock or vibration sensed by the unit 18 will cause the end 25 of the lever 22 to move upwardly against the trip magnet 21 and, through the rod 34, move the ball valve member 32 away from the valve seat 28 to interconnect the lines 14, 15 and 77 to the atmosphere. The bleed down of pressure in lines 14, 15 and 77 continues amount so that the compression spring 71 will move the diaphragm means 59 downwardly whereby the diaphragm portion 66 will close the valve seat 69 and open the valve seat 67. Thus, the atmosphere is disconnected from the chamber 63 and the pressure fluid stored in the accumulator tank 82 is now directed to the chamber 60 through the open valve seat 67 and through the openings 70 in the intermediate diaphragm portion 66 to the chamber 63. Such pressurized fluid is now directed from the chamber 63 through the conduit 78 into the cylinder 39 on the side 44 of the piston 38 to drive the piston 38 downwardly in opposition to the force of the compression spring 45 and thereby immediately and automatically reset the lever 22 back to the position illustrated in FIG. 1 to close the valve seat 28 before the bleed down of the pressure value of the fluid in the conduits 14, 15 and 77 has fallen to a value that would cause the pneumatically operated device 16 to produce its alarm or shut-down signal. With the closing of the valve member 32 by the resetting of the lever 22 against the magnet 20, the chamber 62 of the device 53 will again become pressurized to cause the diaphragm 59 to overcome the force of the compression spring 71 and move the diaphragm means 59 upwardly to close the valve seat 67 and open the valve seat 69 whereby the atmosphere will again be interconnected to the cylinder 39 of the reset means 37 to cause the piston 38 to move upwardly under the force of the comrpession spring 45. The conduit means 14, 15 and 77 will again return to full pressure by the source 11 feeding pressure fluid through the restrictor 13 as long as the ball 32 remains against the vent valve seat 28.

If another excessive shock or vibration is sensed by the device 18, the lever 22 has its member 25 again moved up against the trip magnet 21 to open the valve membrer 32 whereby the chamber 62 of the logic unit 54 is again bled down so that the compression spring 71 moves the diaphragm means 59 downwardly to again open the valve seat 67 and close the valve seat 69. However, because the restrictor 81 is slowly resupplying pressure fluid to the accumulator tank 82 and since the accumulator tank 82 has been effectively depressurized by the first automatic resetting operation and if the second opening of the valve seat 67 occurs too soon after the previous opening thereof, the accumulator tank 82 now has insufficient pressure therein for causing the piston 38 to reset the lever 22 so that the lever 22 remains in its up condition and the ball valve member 32 remains in its up condition. Thus, with the ball valve member 32 in its open condition, the open valve seat 28 continues to bleed down the pressure in the conduits 14, 15 and 77 to the valve that will cause the pneumatically operated device 16 to produce its alarm or shut-down producing signal. The open valve seat 28 will maintain such signal producing value for the device 16 in the conduits 14, 15 and 77 because the bleed through the open valve seat 28 is greater than what pressure fluid can be supplied through the restrictor 13 from the source 11.

Therefore, it can be seen that the control system 10 will readily permit the unit 18 to sense one excessive shock and be immediately and automatically reset without causing the device 16 to produce its alarm or shut-down signal unless a second vibration or excessive shock occurs soon after the first excessive shock or vibration because if the second shock or vibration occurs after the tank 82 has been resupplied sufficient pressure fluid through the restrictor 81 to cause the piston 38 to reset the lever 22, then that second vibration or shock likewise will not cause the device 16 to produce its alarm or shut-down signal.

By having the one-way check valve 79 in the line 49 from the remotely operated reset valve means 52 closely adjacent the reset portion 50, the use of the accumulator tank 82 in operating the reset means 37 during the aforementioned automatic resetting operation will not cause any of the pressure fluid being directed from the accumulator tank 82 to pressurize the line 49 and thereby prevent such pressurized fluid from operating the reset means 37 in the manner previously described.

As previously stated, one of the features of this invention is to provide such a pneumatic control system to operate in the manner previously described with the automatic resetting feature of this invention actually being housed within the housing 19 for the vibration-responsive means so that existing systems can be simply modified by replacing their units 18 with the automatic resetting units of this invention.

Figure 2:
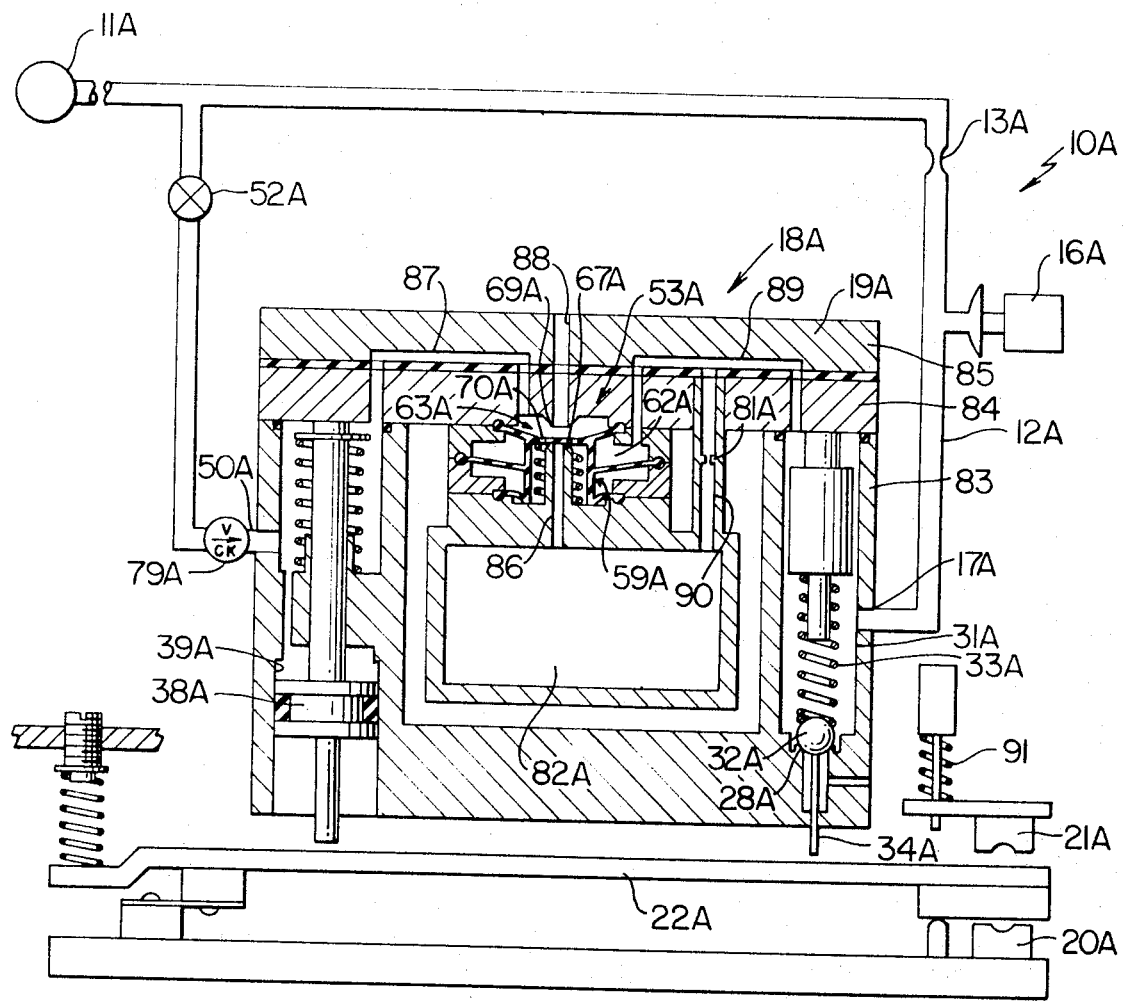
FIG. 2 is a view similar to FIG. 1 and illustrates another embodiment of this invention wherein the vibration-responsive means and automatic resetting means therefor are provided in a self-contained unit.

Therefore, reference is now made to FIG. 2 wherein another embodiment of this invention comprises a control system 10A having parts thereof similar to the control system 10 previously described indicated by like reference numerals followed by the reference letter "A".

As illustrated in FIG. 2, it can be seen that the unit 18A of the system 10A includes the housing means 19A that is made from a plurality of housing parts 83, 84 and 85 suitably secured and sealed together by fastening means and having gasket means therebetween to house therein the aforementioned valve seat 28A and ball valve member 32A therefor, the resetting piston means 38A and its cylinder means 39A, the vibration sensing lever 22A with its reset magnet 20A and trip magnet 21A, ball valve actuator or rod 34A, and the "NOT" logic unit 53A having its accumulator 82A formed within the housing member 83 and interconnected to the valve seat 67A by an internal passage means 86.

The chamber 63A of the unit 53A is interconnected by an internal passage 87 to the cylinder 39A in the same manner as provided by the conduit means 78 previously described and the valve seat 69A is interconnected to the atmosphere by a passage 88 in a manner similar to the nipple 75 previously described. The chamber 62A of the unit 53A is interconnected by an internal passage 89 to the part of the conduit means 12A that is located downstream from the restrictor 13A and pneumatically operated device 16A and is interconnected to the chamber 31A for the valve seat 28A at an inlet port 17A. The internal passage 89 is also interconnected to the accumulator chamber 82A by an internal passage means 90 having the restrictor 81A therein for a purpose similar to restrictor 81 previously described.

The remotely controlled resetting valve means 52A is interconnected through the one-way check valve 79A to the resetting port 50A of the unit 18A. However, if desired, a manual reset plunger 91 can be provided for resetting the lever 22A reather than using or in lieu of the pneumatic reset valve means 22A. If the manual reset plunger 91 is utilized, then the reset inlet port 50A could be plungged so as to seal off the chamber 39A from the atmosphere if the valve means 52A is not to be utilized.

Thus, it can be seen that the control system 10A functions in the same manner as the control system 10 previously described because when pressure is being directed to the pneumatically operated device 16A to prevent the same from creating its alarm or shut-down signal, such pressure is also conveyed to the chamber 62A of the logic unit 53A to hold the diaphragm means 59A in the downward position as illustrated in FIG. 2 to close the valve seat 67A and open the valve seat 69A so that atmosphere is directed to the resetting chamber 39A for the resetting piston 38A. However, when the lever 22A is moved upwardly by a shock exceeding the certain value, the temporary opening of the valve seat 67A and closing of the valve seat 69A permits the pressure in the accumulator chamber or tank 82A to pass through the open valve seat 67A, openings 70A in the diaphragm member 59A, chamber 63A and passage means 87 to the piston 38A to drive the same downwardly to automatically reset the vibration sensing lever 22A in the manner previously described.

Of course, the restrictor 81A prevents chamber 82A from filling with pressure fluid before a certain time period has passed so that if a second excessive shock is created within that certain time period, the chamber 82A cannot be utilized to automatically reset the lever 22A and the lever 22A will remain in its up condition against the trip magnet 21A requiring the device 16A to produce its shut down signal or sound its alarm producing signal.

Therefore, it can be seen that the unit 18A illustrated in FIG. 2 incorporates not only the vibration sensing means of the system of FIG. 1 in the same housing, but also the same incorporates the logic "NOT" unit 53 therein so that only two external connections 17A and 50A are provided for the unit 18A in the same manner as provided by unit 18 by itself whereby in any system where a unit 18 is utilized, the unit 18A can be utilized in place thereof without requiring a change in the plumbing, etc., of the pneumatic control system utilizing such vibration sensing device 18.

Therefore, it can be seen that not only does this invention provide an improved vibration system having means for automatically resetting the vibraiton sensing means after the sensing of one excessive shock or vibration, but also this invention provides an improved vibration sensing unit for such a control system or the like.

While the form of the invention now preferred has been disclosed and described as required by the patent statutes, other forms may be utilized all coming within the scope of the claims which follow:

What is claimed is:

1. In a control system having a device normally disposed in one operative condition thereof and a vibration responsive means operatively interconnected to said device to be unset and thereby cause said device to be in another operative condition thereof when said vibration responsive means senses a vibration in excess of a certain value, the improvement comprising a unit operatively inter-connected to said vibration responsive means to automatically reset the same after the vibration responsive means has sensed one shock in excess of said certain value to prevent that one shock from effectively causing said device to be in said other condition thereof while being ineffective thereafter to reset said vibration responsive means if another excessive shock is sensed by said vibration responsive means within a certain time period after the occurrence of said one excessive shock, said device being pneumatically operated and said vibration responsive means comprising a valve means that effectively vents said device to cause the same to change from said one operative condition thereof to said other operative condition thereof when said vibration responsive means has been reset by said unit and thereafter senses another excessive shock within said certain time period to be unset thereby.

2. In said control system as set forth in claim 1, the further improvement wherein aid unit comprises a pneumatically operated unit for resetting said vibration responsive means after the same has sensed one excessive shock so as to be in an unset condition thereof.

3. In a control system as set forth in claim 2, the further improvement wherein said pneumatically operated unit comprises a "NOT" logic unit.

4. In a control system as set forth in claim 3, the further improvement wherein said "NOT" logic unit receives an input when said device is in said one operative condition thereof, the output of said "NOT" logic unit being utilized for resetting said vibration responsive means.

5. In a pneumatic control system having a pneumatic source, a pneumatically operated device, passage means interconnecting said source to said device to actuate said device, and a vibration responsive valve means interconnected to said passage means to be unset and thereby vent the same to the atmosphere through the valve thereof to prevent further activation passage means to be unset and thereby vent the same to the atmosphere of said device by said source when said vibration responsive valve means senses a vibration in excess of a certain value, the improvement comprising a pneumatically operated unit operatively interconnected to said vibration responsive valve means to automatically reset the same and thereby terminate said vent through said valve thereof after the vibration responsive valve means has sensed one shock in excess of said certain value to prevent that one shock from effectively deactivating said device while being ineffective thereafter to reset said vibration responsive valve means if another excessive shock is sensed by said vibration responsive valve means within a certain time period after the occurrence of said one excessive shock.

6. In a pneumatic control system as set forth in claim 5, the further improvement wherein said pneumatically operated unit has means for directing a pneumatic signal from a signal source to said vibration responsive means to reset the same.

7. In a pneumatic control system as set forth in claim 6, the further improvement wherein said signal source is adapted to be exhausted if the same resets said vibration responsive valve means and said pneumatically operated unit again attempts to reset the same within said certain time period.

8. In a pneumatic control system as set forth in claim 7, the further improvement wherein said signal source comprises an accumulator, said passage means interconnecting said source to said accumulator, said passage means having a pair of restrictor means therein in series between said source and said accumulator, said passage means interconnecting said source to said device through said passage means intermediate said pair of restrictor means.

9. In a pneumatic control system as set forth in claim 8, the further improvement wherein said vibration responsive valve means is adapted to vent said passage means intermediate said pair of restrictor means, said pneumatically operated unit having means for interconnecting said accumulator to said vibration responsive valve means only when said passage means intermediate said restrictor means is vented by said vibration responsive valve means.

10. A self-contained unit for use in a control system having a device normally disposed in one operative condition thereof, said unit having a vibration responsive means adapted to be operatively interconnected to said device to be unset and thereby cause said device to be in another operative condition thereof when said vibration responsive means senses a vibration in excess of a certain value, said unit having resetting means operatively inter-connected to said vibration responsive means to be adapted to automatically reset the same after the vibration responsive means has sensed one shock in excess of said certain value to prevent that one shock from effectively causing said device to be in said other condition thereof while being ineffective thereof to reset said vibration responsive means if another excessive shock is sensed by said vibration responsive means within a certain time period after the occurrence of said one excessive shock, said device being pneumatically operated and said vibration responsive means comprising a valve means that is adapted to effectively vent said device to cause the same to change from said one operative condition thereof to said other operative condition thereof when said vibration responsive means has been reset by said resetting means and thereafter senses another excessive shock within said certain time period to be unset thereby.

11. A self-contained unit as set forth in claim 10 wherein said resetting means comprises a pneumatically operated means for resetting said vibration responsive means after the same has sensed one excessive shock so as to be in an unset condition thereof.

12. A self-contained unit as set forth in claim 11 wherein said pneumatically operated means comprises a "not" logic unit.

13. A self-contained unit as set forth in claim 12 wherein said "NOT" logic unit is adapted to receive an input when said deivce is in said one operative condition thereof, the output of said "NOT" logic unit being adapted to be utilized for resetting said vibration responsive means.

14. A self-contained unit for use in a pneumatic control system having a pneumatic source and passage means for interconnecting said source to a pneumatically operated device to actuate said device, said unit having a vibration responsive valve means adapted to be interconnected to said passage means to be unset and thereby vent said passage means to the atmosphere through the valve thereof to prevent actuation of said device by said source when said vibration responsive valve means senses a vibration in excess of a certain value, said unit having a pneumatically oeprated means operatively interconnected to said vibration vale means to be adapted to automatically reset the same and thereby terminate said vent through said valve thereof after the vibration valve means has sensed one shock in excess of said certain value to prevent that one shock from effectively deactivating said device while being ineffective thereafter to reset said vibration valve means if another excessive shock is sensed by said valve means within a certain time period after the occurrence of said one excessive shock.

15. A self-contained unit as set forth in claim 14 wherein said pneumatically operated means has means adapted for directing a pneumatic signal from a signal source to said vibration responsive valve means to reset the same.

16. A self-contained unit as set forth in claim 15 wherein said signal source forms part of said unit and is adapted to be exhausted if the same resets said vibration responsive valve means and said pneumatically operated means again attempts to reset the same within said certain time period.

17. A self-contained unit as set forth in claim 16 wherein said signal source comprises an accumulator, said unit having passage means for interconnecting said source to said accumulator, said passage means having a restrictor means therein for being disposed between said source and said accumulator.

18. A self-contained unit as set forth in claim 17 wherein said vibration responsive valve means is adapted to vent said passage means intermediate said source and said restrictor means, said pneumatically operated means having means for interconnecting said accumulator to said vibration responsive valve means only when said passage means intermediate said restrictor means and said source is vented by said vibration responsive valve means.

* * * * *